United States Patent
Schaefer et al.

(10) Patent No.: US 6,629,192 B1
(45) Date of Patent: Sep. 30, 2003

(54) METHOD AND APPARATUS FOR USE OF A NON-VOLATILE STORAGE MANAGEMENT SYSTEM FOR PC/AT COMPATIBLE SYSTEM FIRMWARE

(75) Inventors: Joseph A. Schaefer, Olympia, WA (US); Dave Edwards, Olympia, WA (US); Kirk Brannock, Olympia, WA (US); William J. Chalmers, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,434

(22) Filed: Dec. 30, 1999

(51) Int. Cl.[7] .............................................. G06F 12/02
(52) U.S. Cl. ........................................ 711/103; 712/248
(58) Field of Search .............................. 712/216, 248; 711/103

(56) References Cited

U.S. PATENT DOCUMENTS

| | | | |
|---|---|---|---|
| 5,113,512 A | | 5/1992 | Miki et al. |
| 5,247,659 A | | 9/1993 | Curran et al. |
| 5,355,489 A | | 10/1994 | Bealkowski et al. |
| 5,519,843 A | * | 5/1996 | Moran et al. ................ 711/103 |
| 5,615,331 A | | 3/1997 | Toorians et al. |
| 5,835,594 A | | 11/1998 | Albrecht et al. |
| 5,860,083 A | * | 1/1999 | Sukegawa .................... 711/103 |
| 5,930,504 A | | 7/1999 | Gabel |
| 5,937,434 A | * | 8/1999 | Hasbun et al. ............... 711/156 |
| 5,974,546 A | | 10/1999 | Anderson |
| 6,018,806 A | * | 1/2000 | Cortopassi et al. ............. 714/6 |
| 6,026,402 A | | 2/2000 | Vossen et al. |
| 6,032,239 A | | 2/2000 | Beelitz |
| 6,076,118 A | * | 6/2000 | Klein ........................... 710/10 |
| 6,088,759 A | * | 7/2000 | Hasbun et al. ............... 711/103 |
| 6,101,601 A | | 8/2000 | Matthews et al. |
| 6,119,131 A | | 9/2000 | Cabrera et al. |
| 6,138,239 A | | 10/2000 | Veil |
| 6,148,441 A | | 11/2000 | Woodward |
| 6,185,678 B1 | | 2/2001 | Arbaugh et al. |
| 6,192,471 B1 | | 2/2001 | Pearce et al. |
| 6,256,031 B1 | | 7/2001 | Meijer et al. |
| 6,308,264 B1 | | 10/2001 | Rickey |
| 6,308,265 B1 | | 10/2001 | Miller |
| 6,378,128 B1 | | 4/2002 | Edelstein et al. |
| 6,401,202 B1 | | 6/2002 | Abgrall |
| 6,401,208 B2 | | 6/2002 | Davis et al. |
| 6,421,776 B1 | * | 7/2002 | Hillis et al. ..................... 713/2 |
| 6,430,481 B1 | | 8/2002 | Lovelace, II et al. |
| 6,446,201 B1 | | 9/2002 | Gunther |

FOREIGN PATENT DOCUMENTS

JP          411039152 A     2/1999

OTHER PUBLICATIONS

Jerry Jex, *Flash Memory BIOS for PC and Notebook Computers*, May 9–10, 1991, pp. 692–695.

* cited by examiner

*Primary Examiner*—Eric Coleman
(74) *Attorney, Agent, or Firm*—Blakely, Sokoloff, Taylor & Zafman LLP

(57) ABSTRACT

In one embodiment, the invention is an apparatus. The apparatus includes a BIOS embodied in a non-volatile storage device. The apparatus also includes a non-volatile storage manager embodied in the non-volatile storage device, the non-volatile storage manager controlling access to a portion of the BIOS.

18 Claims, 5 Drawing Sheets

METHOD AND APPARATUS FOR USE OF A NON-VOLATILE STORAGE MANAGEMENT SYSTEM FOR PC/AT COMPATIBLE SYSTEM FIRMWARE

BACKGROUND OF THE INVENTION

1. Field of the Invention

The invention generally relates to storage of programs and more particularly relates to storing a BIOS (Basic Input Output System) in a system.

2. Description of the Related Art

When a computer system starts up, typically it first runs instructions on the processor(s) which are stored in a BIOS (Basic Input Output System). These instructions may initialize the system and may help the system determine how it is configured and how it may operate. Typically, the BIOS is stored either in a ROM (read only memory) or in a special RAM (random access memory).

If the BIOS is stored in a ROM, it may not be changed without going through either the extreme measure of replacing the ROM or reprogramming the ROM if that is possible. When it is possible to reprogram a ROM, it is typically a highly involved process, and often requires removing the ROM from the computer system for programming in a special programming device. If the BIOS is stored in a RAM, that RAM must be powered at all times, often leading to a requirement that a special battery be supplied as part of the computer system for the sole purpose of powering the RAM for the BIOS. Still, at some time that battery must be replaced, and that process requires either backing up the contents of the BIOS or losing the contents of the BIOS.

If the contents of the BIOS are lost, the system will not have any specialized configuration information, and may not function at all. Also, if the contents of the BIOS are incorrect, such as containing a bug in the programming for example, then the BIOS must be fixed. Using a RAM, the fix may be made by rewriting the RAM, or possibly rewriting a portion of the RAM corresponding to the area where the bug is located. Using a ROM, the ROM must either be replaced or reprogrammed as mentioned above. Likewise, any configuration values stored in a BIOS that are user programmable must be stored in a RAM.

SUMMARY OF THE INVENTION

In one embodiment, the invention is an apparatus. The apparatus includes a BIOS embodied in a non-volatile storage device. The apparatus also includes a non-volatile storage manager embodied in the non-volatile storage device, the non-volatile storage manager controlling access to a portion of the BIOS.

BRIEF DESCRIPTION OF THE DRAWINGS

The present invention is illustrated by way of example and not limitation in the accompanying figures.

DETAILED DESCRIPTION

A method and apparatus for use of a non-volatile storage management system for PC/AT compatible system firmware is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
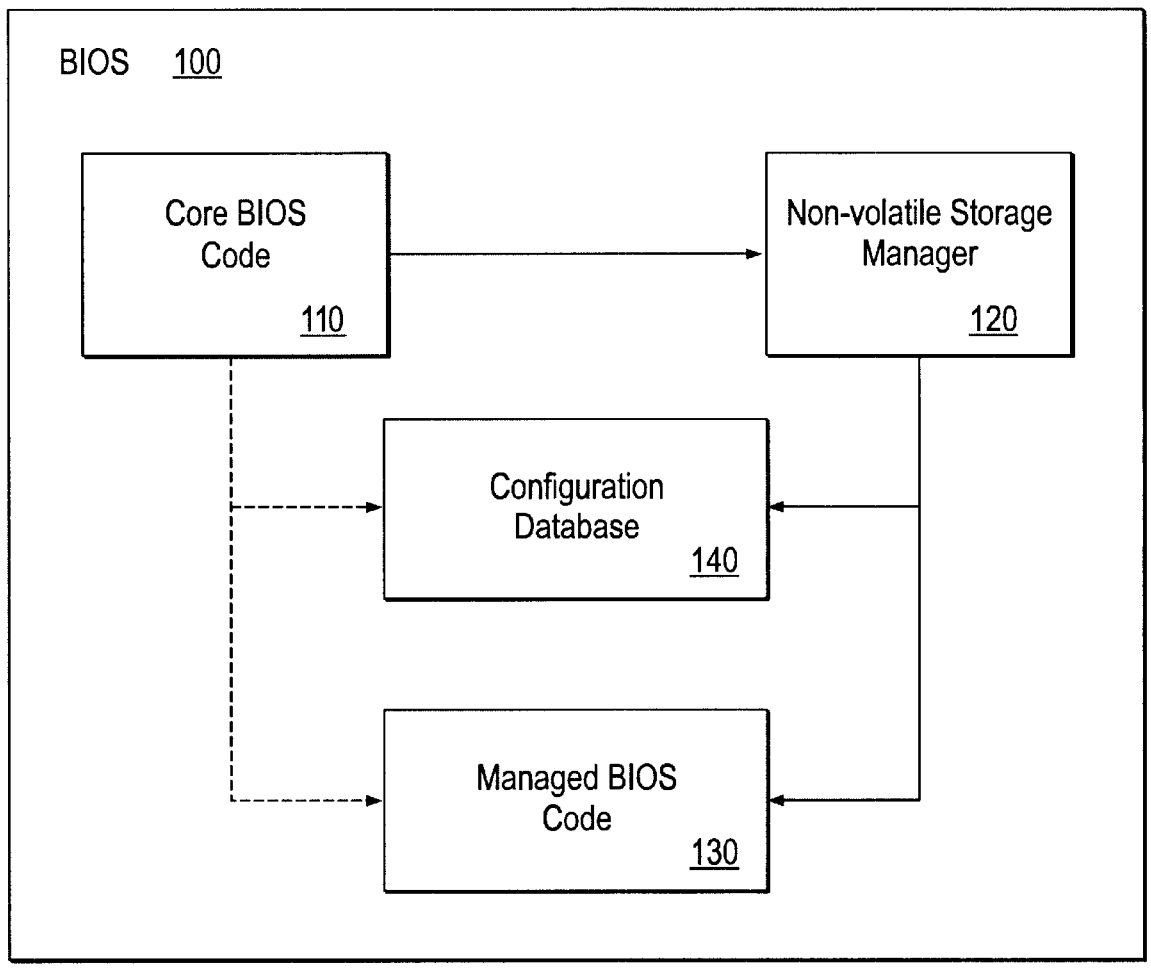
FIG. 1 illustrates a block diagram of a BIOS utilizing non-volatile storage management.

Illustrated in FIG. 1 is a block diagram of a BIOS (Basic Input Output System) using a non-volatile storage management system. BIOS 100 is a non-volatile memory device embodying the entire BIOS. Shown embodied in BIOS 100 are core BIOS code (unmanaged) 110, non-volatile storage manager (unmanaged BIOS code) 120, managed BIOS code 130 and configuration database 140. Core BIOS code 110 and managed BIOS code 130 collectively make up the system firmware of a computer, also known as BIOS. The core BIOS code is used at startup to provide some very low-level functions, critical initialization of the computer system and to instantiate the remaining managed BIOS code.

Non-volatile storage manager 120 is the firmware component that controls access to all managed code and data, and it manages the portion of the BIOS 100 that is put under its control. In particular, the managed BIOS code 130 and the configuration database 140 are stored in the portion of the BIOS 100 that is under the control of the non-volatile storage manager 120. The configuration database 140 is the database holding the values of configuration variables or information utilized by the BIOS code in initializing or maintaining the system. Under circumstances during which the non-volatile storage manager 120 is active, core BIOS code 110 does not access either managed BIOS code 130 or configuration database 140 directly, rather it accesses managed BIOS code 130 and configuration database 140 through the non-volatile storage manager 120. However, when the core BIOS code 110, managed BIOS code 130 and configuration database 140 are all shadowed in a memory other than the original BIOS 100 (such as RAM for example) then the core BIOS code 110 may access the managed BIOS code 130 and configuration database 140 directly. Also, as will be appreciated, when BIOS 100 is embodied in a flash memory device, the non-volatile storage manager 120 may be a flash memory manager.

Figure 2:
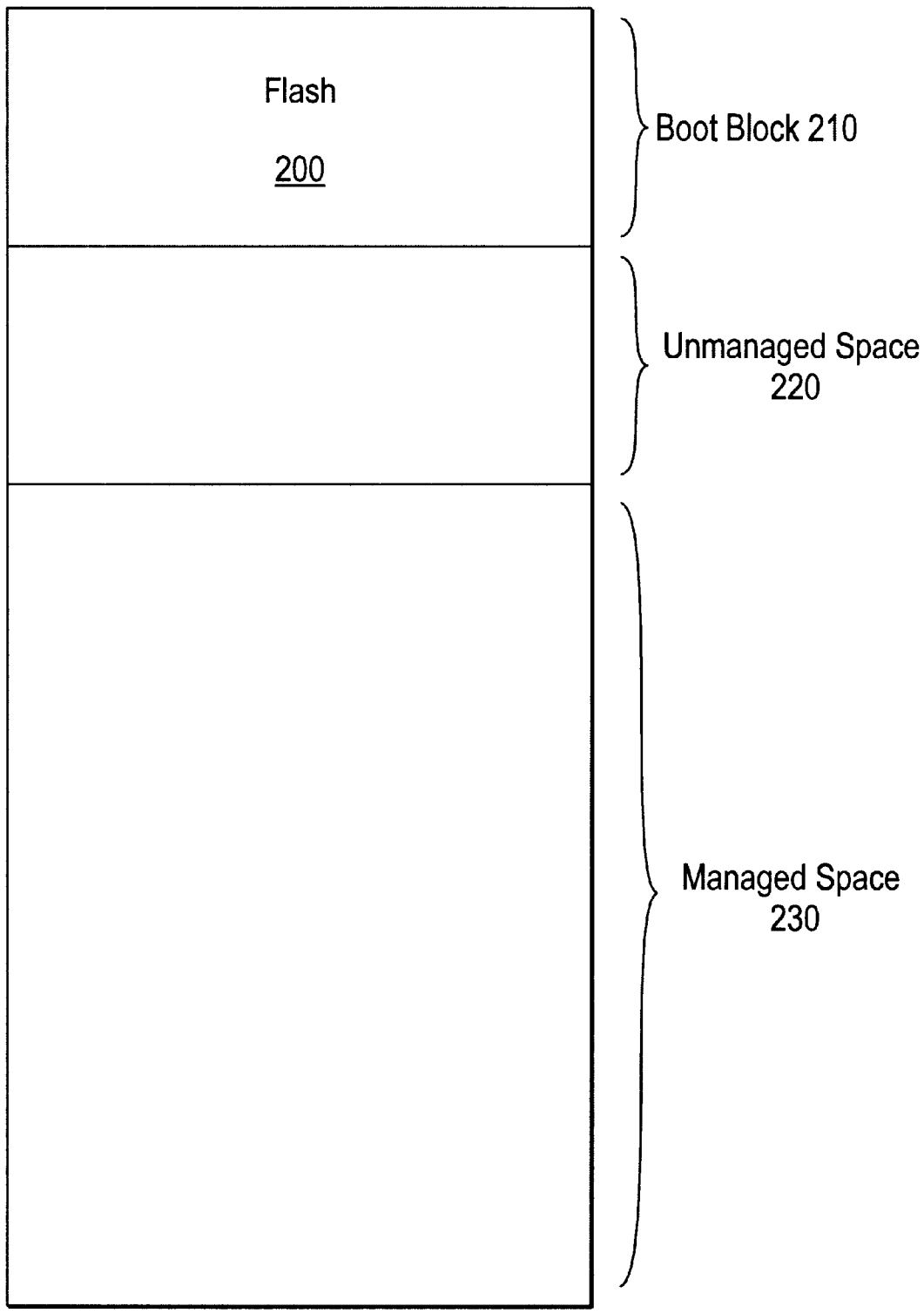
FIG. 2 illustrates an alternate embodiment of a BIOS utilizing non-volatile storage management.

Illustrated in FIG. 2 is an alternative embodiment of a flash memory device 200 as used to hold a BIOS making use of a non-volatile storage manager 120. The flash device is divided into three sections, boot block 210, unmanaged space 220, and managed space 230. The boot block is typically used to contain recovery code. Recovery code is responsible for repairing the contents of flash device 200 in the event that the contents of one or both of the managed space 230 or unmanaged space 220 are corrupt. Recovery code is usually protected through hardware mechanisms, such that it cannot be easily modified. The boot code also contains the first instructions to be executed by the system. As such, it must pass execution to the BIOS code contained within unmanaged space 220, after determining that a recovery condition is not present.

Unmanaged space 220 is a portion of the flash device 200, which is not managed by the non-volatile storage manager 120. Unmanaged space 220 may contain the core BIOS code 110 and the non-volatile storage manager 120. The core BIOS code 110 is responsible for preparing the system to execute the managed BIOS code 130. This may include loading of the core BIOS code into RAM.(typically referred to as shadowing). In a typical flash device execution from the flash device 200 is not permitted during programming. Since the non-volatile storage manager 120 may need to perform some programming of the flash device during initialization, the core BIOS must execute in memory other than the physical flash device being programmed.

Typically another reason for execution from RAM is due to RAM offering a substantial performance increase over any other form of memory in the system. Once preparation is complete for shadowing (system memory has been detected and activated for example), the core BIOS invokes the non-volatile storage manager 120 to load the managed BIOS code 130 from managed space 230 into main memory (RAM or other memory for example). Once the managed BIOS code 130 is loaded, execution flow is passed to the managed BIOS code 130.

Managed space 230 contains additional BIOS code, which is managed by the non-volatile storage manager 120 and may be executed after the non-volatile storage manager 120 has been loaded and initialized. Managed space 230 may contain one or more BIOS code components, herein referred to as managed BIOS code 130. Additionally, the managed space 230 contains the configuration database which may be used by the BIOS code to reconstruct how the system was or is configured during the reboot or reset process. The configuration database contains information about what devices are in the system and how each device is configured, and may include parameters such as speed of the device, type of the device, logical and physical identifications and locations of the device, configuration data for the device (often in binary form) and restrictions upon use of the device among other information.

Information stored within the managed space 230 is managed by the non-volatile storage manager 120. The information within the managed space 230 is organized into objects or groups of data and associated with a handle or name. By supplying the handle or name to the non-volatile storage manager 120, a program may request the data associated with the handle. Likewise, when data (or code) is stored within the managed space 230, a handle is supplied along with the data to the non-volatile storage manager 120. Furthermore, if data is to be deleted, it may be deleted by supplying the handle associated with the data to the non-volatile storage manager 120 and requesting its deletion. Similarly, if data is to be rewritten, or updated, in the managed space 230, the replacement data may be supplied along with the handle, and the non-volatile storage manager 120 will relocate or rewrite the data into the managed space 230, keeping it associated with the same handle. Should something interrupt any operation such as a write or re-write, the non-volatile storage manager 120 may restore the data to its original, unchanged state. An interruption may be caused by a power surge or other electrical irregularity which is considered outside the normal operating mode of the flash device 200. As such, a system designer can confidently handle one form of recovery from unusual system events by assuming that the procedures associated with performing operations were followed and by again requesting the interrupted operation if it is determined that it should be attempted again. In one embodiment, the BIOS code is composed of macro-effector pairs. Some of the macros and effectors may be found in the unmanaged space 220 of the FLASH device 200, and some macros in the unmanaged space 220 may refer to effectors in the managed space 230 of the flash device 200. Macro-effector pairs are made up of a macro and an effector. A macro contains a list of parameters and a reference to a corresponding effector. An effector contains the code suitable to execute a function or perform an operation, and uses the parameters in the macro that refers to the effector to perform that operation. The reference to the effector may take on a variety of forms, including a pointer to the effector or a reference usable by the non-volatile storage manager 120 to locate the effector. To the extent that a macro may cause an effector in the managed space 230 to be executed before the non-volatile storage manager 120 is operational, the reference to the effector must be designed to enable location of the effector without using the non-volatile storage manager 120. Understandably, references from a macro to an effector within the managed space 230, which do not use the non-volatile storage manager 120 must be updated when the location of the effector within the managed space 230 changes. In one embodiment, any references from a macro to an effector within the managed space 230 which do not use the non-volatile storage manager 120 are stored within a table accessible by the non-volatile storage manager 120 called the machine initialization table (MIT). The machine initialization table is then updated through the non-volatile storage manager 120. In the event the MIT update is interrupted the boot portion of the core BIOS code 110 will detect the interruption early by utilizing a special function of the non-volatile storage manager 120. The special function performs the detection without the use of system resources that have not been initialized, or are otherwise not available. If an interruption is detected, the MIT will be regenerated as previously described.

Figure 3:
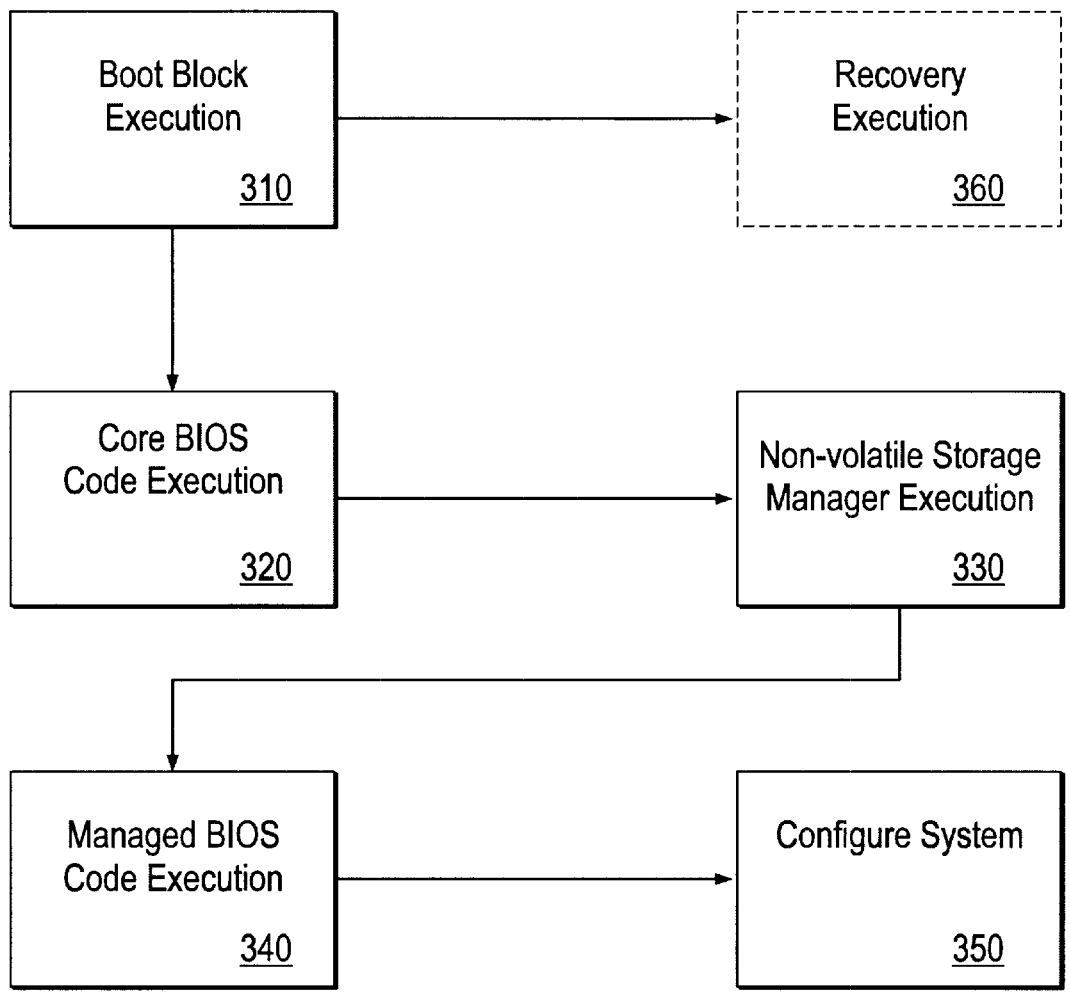
FIG. 3 illustrates a process of executing the instructions of a BIOS utilizing non-volatile storage management.

Turning to FIG. 3, an illustration of a method of operating firmware or a BIOS using a non-volatile storage management system is presented. At block 310, BIOS execution begins in the boot block, where the integrity check on the unmanaged space 220 and managed space 230 is performed. If the integrity check fails, recovery, step 360, is invoked, otherwise execution of the BIOS code results in the process flowing to block 320, execution of the core BIOS. Executing the core BIOS enables the system to execute the remaining BIOS code, which is to execute the non-volatile storage manager in block 330. Next the managed BIOS code is loaded in step 340 through the use of the non-volatile storage manager. The two portions of the BIOS code, the unmanaged and managed portions, then are executed together to configure the system in block 340.

Figure 4:
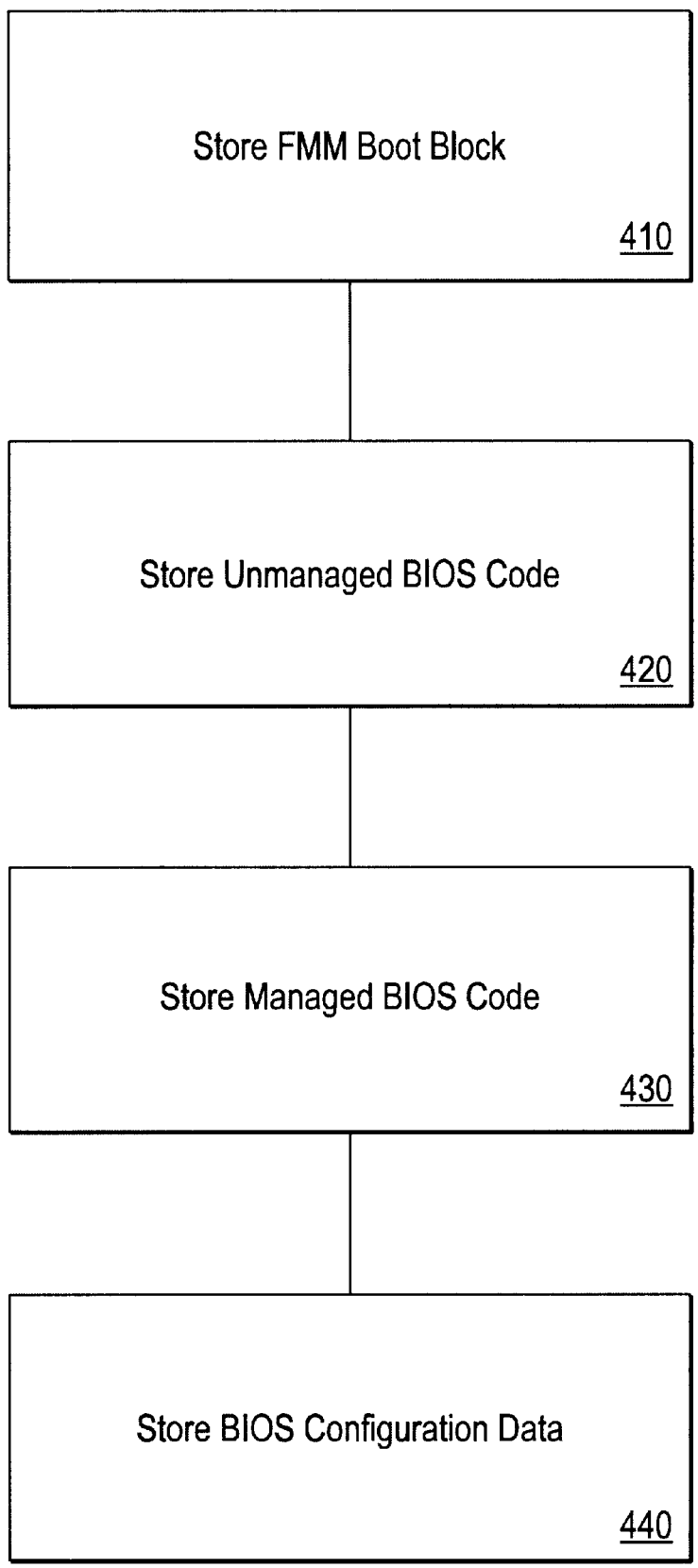
FIG. 4 illustrates a process of creating a BIOS suitable for use with non-volatile storage management.

Turning to FIG. 4, an embodiment of a method of making or storing data into a FLASH device for use in firmware working in conjunction with a non-volatile storage manager 120 is illustrated. At block 410, the FLASH memory management (FMM) boot block is stored in the boot block of the FLASH device. At block 420, the unmanaged BIOS code is stored in the unmanaged portion of the FLASH device. Utilizing the non-volatile storage manager 120, at block 430 the managed portion of the BIOS code is stored in the flash memory device. Finally, at block 440, the configuration database to be used in conjunction with the BIOS code is stored in the managed portion of the FLASH device.

Figure 5:
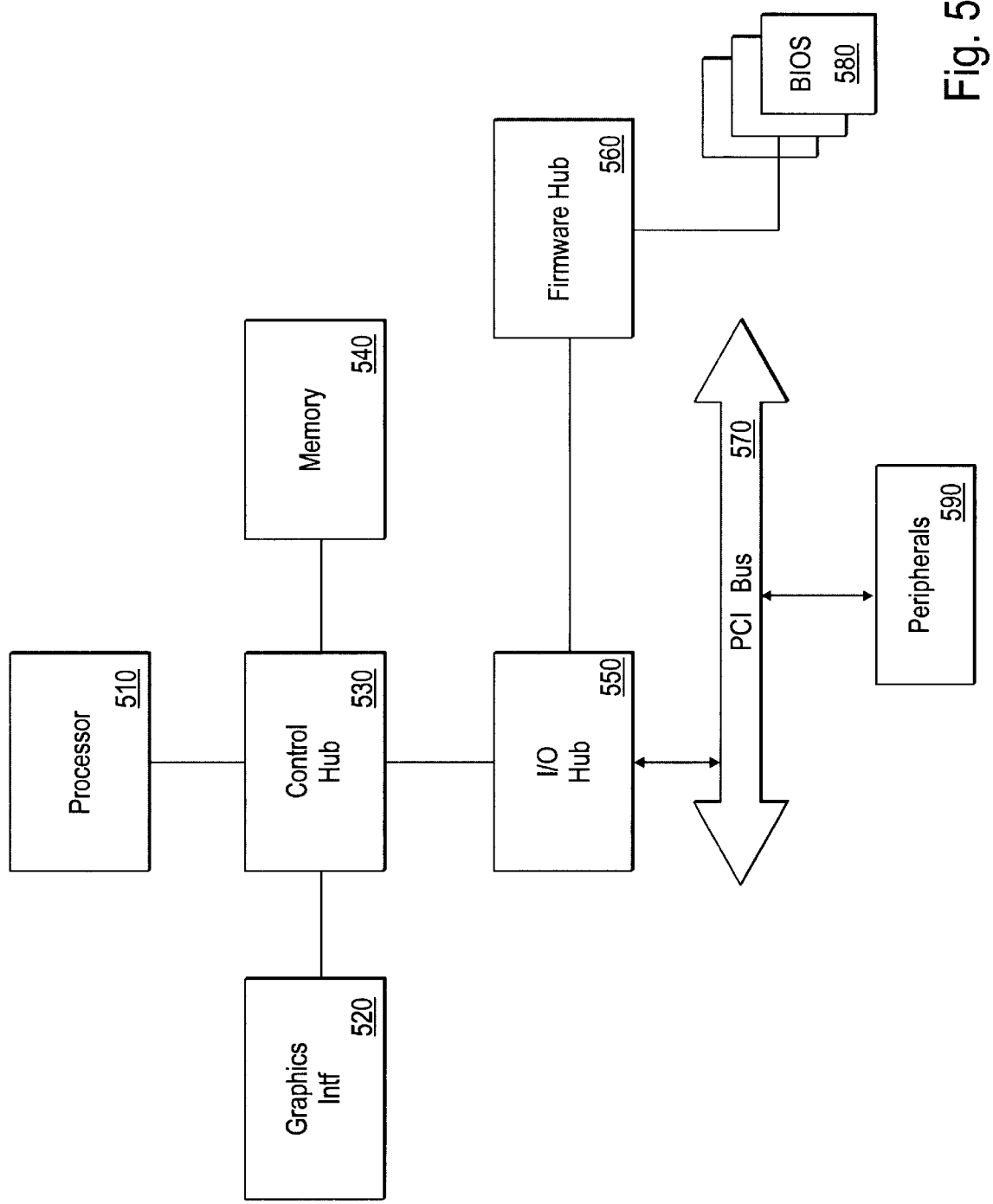
FIG. 5 illustrates a system which may include a BIOS utilizing non-volatile storage management.

Turning to FIG. 5, a system suitable for use with a BIOS utilizing non-volatile storage management is illustrated. Processor 510 is coupled to control hub 530. Control hub 530 is coupled to memory 540, to i/o hub 550, and to graphics interface 520. I/O Hub 550 is coupled to PCI bus 570 and Firmware hub 560. PCI bus 570 is coupled to peripherals 590. Firmware hub 560 is coupled to the BIOS 580. It will be appreciated that many other systems may have different arrangements of different components and still be suitable for use with the BIOS utilizing non-volatile memory management.

In one embodiment, BIOS 580 is a flash memory device and contains macro-effector pairs, which execute the startup functions of the system. The startup functions of the system may include finding and initializing the non-volatile storage manager 120 of the BIOS 580, thus enabling access to the managed space of the BIOS 580. The startup functions also may find and initialize the control hub 530, the memory 540, the i/o hub 550, the PCI bus 570, the peripherals 590, the Firmware hub 560 and the graphics interface 520. Alternatively, BIOS 580 may contain macro-effector pairs which cause processor 510 to find control hub 530, and then cause processor 510 to cause control hub 530 to find and initialize the rest of the system.

It will be appreciated that in an alternate embodiment the startup functions may initialize only the memory controller 560, portions of the control hub 530, portions of the i/o hub 550 and either none of or one or more select peripherals connected to the PCI bus 570. Note, also that in one embodiment the flash device embodying BIOS 580 is coupled to the PCI bus. In an alternate embodiment, BIOS 580 may be coupled to a new interface controller which is coupled to the control hub 530.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A system comprising:

a processor;

a memory control hub coupled to the processor;

a BIOS, the BIOS embodied in a non-volatile storage device coupled to the processor, a non-volatile storage manager embodied in the non-volatile storage device, the non-volatile storage manager controlling access to a portion of the BIOS; and a random-access memory coupled to the memory control hub, the random- access memory having embodied therein a copy of the BIOS.

2. The system of claim 1 wherein:

the BIOS includes a code portion and a configuration database.

3. The system of claim 2 wherein:

access to the configuration database is controlled by the non-volatile storage manager.

4. The system of claim 3 wherein:

the code portion has an unmanaged portion and a managed portion, and access to the managed portion is controlled by the non-volatile storage manager.

5. The system of claim 1 wherein:

the non-volatile memory device is a FLASH memory device using a FLASH memory management as the non-volatile storage manager.

6. A method comprising:

executing a first portion of BIOS code embodied in a non-volatile storage device; finding a non-volatile storage manager embodied in the non-volatile storage device;

activating the non-volatile storage manager;

managing the non-volatile storage device with the activated non-volatile storage manager;

executing a second portion of BIOS code embodied in the non-volatile storage device and managed by the non-volatile storage manager;

finding a random-access memory; and shadowing the second portion of BIOS code in the random-access memory.

7. The method of claim 6 wherein:

executing the second portion of BIOS code includes accessing configuration information embodied in the non-volatile storage device and managed by the non-volatile storage manager.

8. The method of claim 7 wherein:

the method is part of an initialization routine used by a system.

9. The method of claim 7 wherein:

the method is part of a startup process of a computer system.

10. The method of claim 6 wherein:

the non-volatile memory device is a FLASH memory device and the non-volatile storage manager is a FLASH memory manager.

11. A medium embodying instructions which, when executed by a processor, cause the processor to perform a method, the method comprising:

executing a first portion of BIOS code embodied in a non-volatile storage device; finding a non-volatile storage manager embodied in the non-volatile storage device;

activating the non-volatile storage manager;

managing the non-volatile storage device with the activated non-volatile storage manager;

executing a second portion of BIOS code embodied in the non-volatile storage device and managed by the non-volatile storage manager;

finding a random-access memory; and shadowing the second portion of BIOS code in the random-access memory.

12. The medium of claim 11 further embodying instructions which when executed by a processor cause the processor to perform the method wherein:

executing the second portion of BIOS code includes accessing configuration information embodied in the non-volatile storage device and managed by the non-volatile storage manager.

13. The medium of claim 11 further embodying instructions which when executed by a processor cause the processor to perform the method wherein:

the method is part of an initialization routine used by a system.

14. The medium of claim 11 further embodying instructions which when executed by a processor cause the processor to perform the method wherein:

the method is part of a startup process of a computer system.

15. An apparatus comprising:

means for storing a BIOS in a non-volatile manner, the means for storing including a means for managing the means for storing, the means for managing activated by the BIOS of the means for storing;

means for storing data using continuous power access; and means for processing, the means for processing for copying the BIOS from the means for storing a BIOS in a non-volatile manner to the means for storing data using continuous power access.

16. The apparatus of claim 15 wherein:

the BIOS includes a code portion and a configuration database.

17. The apparatus of claim 16 wherein:

access to the configuration database is controlled by the means for managing.

18. The apparatus of claim 16 wherein:

the code portion has an unmanaged portion and a managed portion, and access to the managed portion is controlled by the means for managing.

\* \* \* \* \*